Patented Aug. 10, 1954

2,686,136

UNITED STATES PATENT OFFICE 2,686,136

DYEABLE RESIN-MODIFIED ACRYLONITRILE POLYMERS AND METHOD FOR PRODUCING SAME

William R. McClellan, Kennett Square, Pa., assignor to E. I. du Pont de Nemours and Company, Wilmington, Del., a corporation of Delaware No Drawing. Application July 24, 1951,
Serial No. 238,385

16 Claims. (Cl. 117—103)

1

This invention relates to a new process for preparing dyeable shaped objects of polyacrylonitrile and to the new polyacrylonitrile compositions used therein.

Polyacrylonitrile has long been known and its desirable physical properties, particularly for film and fiber outlets, have been well recognized. However, polyacrylonitrile is extremely indifferent to most of the commercially available dyes and is also difficult to handle because of its relatively high insolubility in most of the common organic solvents and its inability to be processed under melt conditions. One solution to this dyeing problem involves the preparation of acrylonitrile polymers containing relatively minor proportions of combined dyeable copolymerizables—see for instance U. S. Patent 2,491,471. However, such copolymers do not have the light and heat stability of polyacrylonitrile.

One solution of the handling problem involves the formation of polyacrylonitrile shaped objects, particularly fibers, by spinning solutions or dispersions of the polymer in certain salt solutions followed by suitable drawing and leaching steps. See for instance British patent applications 21,082/48 and 21,083/48 and the copending applications of Bechtold Ser. No. 231,273, filed June 12, 1951, and McClellan Ser. No. 231,248, filed June 12, 1951. Shaped polyacrylonitrile objects prepared by these latter processes can be "dyed" with most of the standard dyes while the shaped object is still in the gel stage, probably by direct physical absorption, since the gel structure does not have affinity for dyes, i. e., does not appreciably lower the concentration of dye in the dye bath. In any event, since the dyeing must be carried out prior to the isolation of the polyacrylonitrile shaped object in final form, it is obviously of limited applicability.

This invention has as an object the provision of new acrylonitrile polymer compositions. A further object is the preparation of shaped objects of these compositions. Another object is the preparation of shaped objects of acrylonitrile polymer compositions which shaped objects are readily dyeable. A still further object is the preparation of dyed objects of acrylonitrile polymer compositions. Other objects will appear hereinafter.

These objects are accomplished by the present invention, wherein an acrylonitrile polymer shaped object such as a film or a fiber containing from 5 to 30% (and preferably 10 to 20%) based on the weight of the total composition, i. e., of acrylonitrile polymer plus resin, of a thermosetting formaldehyde/active hydrogen containing organic compound resin is prepared by impregnating a shaped polyacrylonitrile gel object, wherein the gel object dries irreversibly and contains not less than 25% and preferably not less than 50% nor more than 80% of liquid acrylonitrile polymer dispersant, preferably a hydroxyl compound, e. g., water and/or alcohol, i. e., from 20% to 75%, and preferably 20% to 50% acrylonitrile polymer, with an aqueous solution of a heat reactive formaldehyde/active hydrogen containing organic compound resin, preferably an aminoplast or phenoplast resin, wherein the ratio of formaldehyde to the active hydrogen containing organic component is in the range 1 to 2 moles formaldehyde per mole of the other resin component until the shaped gel object absorbs from 5 to 30% and preferably 10 to 20% by weight of the formaldehyde resin based on the total composition of polymer plus resin, drying the impregnated gel object whereby the water is irreversibly removed and insolubilizing the resin within the polymer structure by heating the dried impregnated shaped object at from 120 to 160° C. for from 10 to 60 minutes. The shaped irreversible gel objects used in this invention are well known in the art, and examples of these are described in British patent applications 21,082/48 and 21,083/48 and in the copending applications of Bechtold Ser. No. 231,273 and McClellan Ser. No. 231,248, previously mentioned. The formaldehyde/active hydrogen containing organic compound resins are those well known in the art such as the formaldehyde resins with phenols, amines and amides, particularly the ureas. For convenience, these resins are hereafter called simply formaldehyde resins.

The following examples in which parts are by weight are illustrative of the invention.

*Example I*

A concentrated resin solution is prepared by dissolving 60 parts of urea in 160 parts of "HMU solution" (a 65% aqueous solution of methylolureas that contains formaldehyde and urea in a mole ratio of 5:1; see Re. 23,174 of U. S. Patent 2,467,212). To the resultant solution (now containing formaldehyde and urea in a mole ratio of 1.65:1) is added with stirring at 10° C. 32 parts of a 40% aqueous solution of hexamethylenediamine followed by 15 parts of a 10% aqueous solution of p-toluenesulfonic acid. A precipitate forms upon the addition of the hexamethylenediamine. The solution is then heated with stirring until substantially all of this precipitate is dissolved and a clear solution is formed. This occurs at about 70° C. with the exact temperature varying a little depending on the rate of heating and the efficiency of stirring of the reaction mixture during the heating period. The clear solution is then cooled to room temperature and filtered to remove traces of undissolved material. The resin-treating solution comprises 30 parts of the above concentrated resin solution, 70 parts of water, and 0.4 part of p-toluenesulfonic acid.

A solution of 180 parts of sodium thiocyanate, 120 parts of water, and 120 parts of methanol is cooled to −13° C. This solution is then poured over 60 parts of powdered polyacrylonitrile cooled to −13° C. in a flask. The flask is immediately stoppered and shaken vigorously for about one minute. In this operation good wetting of the powdered polymer is obtained before solution commences and the system becomes viscous. On warming to room temperature a clear solution is obtained which is filtered, deaerated, and poured into a spinning bomb.

This solution at 25° C. is spun at a pump speed of about 3 cc./min. through a 30 hole (5 mil hole size) spinneret into water at 8–10° C. A short bath travel of only three inches is used. The yarn then passes under a free rolling roller and out of the bath in a direction at right angles to the original direction of travel. The yarn is then passed around a glass rod to give a snubbing action, and from the glass snubber rod back into the coagulating bath for a travel of 20 inches and then out of the bath onto a Godet wheel traveling at a linear speed of 17 ft./min. The yarn is passed from the Godet wheel through a water bath at 80° C. with a travel of seven inches to a windup bobbin traveling at a linear speed of 35 ft./min. The free rolling roller preceding the snubber rod has a linear speed of 8.5 ft./min. and accordingly the yarn is stretched 2× in the coagulating bath between the snubber rod and the Godet wheel. The gel yarn is stretched an additional 2.06× in the hot water bath between the Godet wheel and the windup. This yarn is given a 4Z twist in the gel state. The preparation of this gel yarn is discussed in greater detail in the copending application of McClellan Ser. No. 231,248.

The polyacrylonitrile gel yarn thus prepared, containing about 70% water, is immersed in the form of a skein for two hours at 25° C. in the above-described resin-treating solution. The yarn is then rinsed in acetone to remove excess treating solution from its surface, and then wrapped on a bobbin, air-dried at room temperature for 30 minutes, and finally baked in an air oven at 140° C. for 30 minutes. The baked yarn in skein form is then boiled-off (exposed for one hours to boiling water containing 0.1% of a commercial detergent—the alkali metal salt of a long chain alcohol sulfate). The resin-modified yarn thus obtained after drying exhibits excellent receptivity for representative acid, acetate, direct, and vat dyes. A control yarn prepared by drying the polyacrylonitrile gel yarn at 25° C., while wrapped on a bobbin, followed by boiling-off in skein form exhibits essentially no receptivity for these same dyes. The tenacity and elongation of both the resin-treated and control yarns are essentially the same. Specifically, these are 1.4 g. p. d. at 17% elongation for the resin-treated yarn and 1.5 g. p. d. at 17% elongation for the control yarn. The resin-modified yarn shrinks 14.5% during this modification treatment and exhibits a final denier of 465, while a control yarn shrinks 10% and exhibits a final denier of 360.

Calculations based on these results indicate the resin-modified yarn to contain 82% polyacrylonitrile and 18% resin. During the drying and/or baking treatment, the yarns on the bobbins build up some tension on drying out and, accordingly, a small amount of shrinkage from a relaxation effect occurs upon removal of the dried or baked yarn from the bobbins. A small amount of shrinkage might also arise if any drying of the yarn occurs during the skeining operation. The bulk of the shrinkage, however, with both the resin-treated yarn and the unmodified control yarn occurs during the boil-off treatment.

Two other samples of gel polyacrylonitrile yarn are treated with aqueous solutions of unmodified urea/formaldehyde resin by the same procedure described above for the hexamethylenediamine-modified urea/formaldehyde resin. One solution, prepared by dissolving 7.4 parts of urea and 0.5 part of diammonium phosphate in a solution of 19.6 parts of "HMU" in 73.0 parts of water contains formaldehyde and urea in a molar ratio of 1.65:1. The other solution prepared similarly by dissolving 5.9 parts of urea and 0.5 part of diammonium phosphate in a solution of 21.1 parts of "HMU" solution in 73.0 parts of water contains formaldehyde and urea in a molar ratio of 2.0:1. The gel polyacrylonitrile yarn treated with the former solution exhibits physical properties similar to those described above for yarn treated with the hexamethylenediamine-modified urea/formaldehyde resin solution and good receptivity for acid, acetate, direct, and vat type dyes, although the dye receptivities are noticeably poorer than the yarn treated with the diamine-modified resin. Yarn treated with the latter solution, i. e., the unmodified urea/formaldehyde resin solution containing urea and formaldehyde in a molar ratio of 1:2.0, while exhibiting good physical properties, shows poorer receptivity for representative acid, acetate, direct, and vat type dyes than yarn treated with a resin containing urea and formaldehyde in a ratio of 1:1.65.

*Example II*

Polyacrylonitrile gel yarn (prepared as given previously) is immersed, in the form of a skein, for thirty minutes in a resin-treating solution comprising 20 parts of the concentrated hexamethylenediamine-modified resin solution of Example I, 80 parts of water, and 0.3 part of p-toluenesulfonic acid. After rinsing in acetone, the yarn is wrapped on a bobbin, air-dried at room temperature, and then baked in an air oven at 140° C. for thirty minutes. The baked yarn is then boiled-off in skein form. The dried, resin-modified yarn thus obtained, which shrinks 9.1% during this treatment, has a denier of 441 and a tenacity of 1.3 g. p. d. at 19% elongation and exhibits excellent receptivity for representative acid, acetate, direct, and vat dyes. A control yarn is prepared by drying the polyacrylonitrile gel yarn overnight at 25° C. while wrapped on a bobbin followed by boiling off in skein form. This control yarn, which shrinks 2.2% during this treatment, has a denier of 347 and a tenacity of 1.4 g. p. d. at 18% elongation and exhibits essentially no receptivity for these same representative dyes. Calculations based on the above data indicate the resin-modified yarn to contain 85% polyacrylonitrile and 15% resin.

Two other samples of gel polyacrylonitrile yarn are treated in this same manner except that the resin-treating solution for one consists of 7 parts of the concentrated resin solution, 93 parts of water, and 0.15 part of p-toluenesulfonic acid and for the other consists of 65 parts of the concentrated resin solution, 35 parts of water, and 0.4 part of p-toluenesulfonic acid. The dried yarn treated with the more dilute resin solution contains approximately 7% resin and exhibits receptivity for acid and direct dyes, being somewhat better than the control yarns in this respect. The dried yarn, treated with more concentrated resin solution, contains approximately 35% resin and exhibits excellent receptivity for representative acid, direct, and vat dyes. This yarn, however, has a tendency of only 0.7 g. p. d. at 5% elongation and is quite brittle.

*Example III*

Polyacrylonitrile gel yarn (similar to that of Examples I and II) is treated in the same manner as described in Example II except that the resin-treating solution consists of 30 parts of the concentrated hexamethylenediamine-modified resin solution of Example I, 70 parts of water, and 0.35 part of p-toluenesulfonic acid. The dried resin-modified yarn contains 18.5% resin and has a denier of 444 and a tenacity of 1.3 g. p. d. at 15% elongation. It exhibits excellent receptivity for representative acid, direct, and vat dyes, with the dyed yarns exhibiting excellent washfastness.

A control yarn is prepared by drying the gel polyacrylonitrile yarn, while wrapped on a bobbin, for thirty minutes at 25° C., then baking in an oven at 140° C. for thirty minutes, and finally boiling-off the yarn in skein form. This yarn shrinks a total of 1.7% during the treatment and has a denier of 331 and a tenacity of 1.4 g. p. d. at 15% elongation and exhibits essentially no receptivity for these same representative dyes.

Another control yarn is prepared by drying the gel polyacrylonitrile yarn while wrapped on the bobbin overnight in air at 25° C. followed by boiling-off the yarn in skein form. This yarn, which shrinks a total of 14% during the treatment, has a denier of 372 and a tenacity of 1.3 g. p. d. at 17% elongation and exhibits no receptivity for these same representative dyes.

Two other samples of gel polyacrylonitrile yarn are treated in the same manner except that the treating solutions consist of (a) 10 parts of the concentrated resin solution, 90 parts of water, and 0.15 part of p-toluenesulfonic acid and (b) 50 parts of the concentrated resin solution, 50 parts of water and 0.4 part of p-toluenesulfonic acid. The yarn obtained in the treatment with the more dilute resin solution (a) contains approximately 10% resin and exhibits only slight receptivity for the dyes mentioned above. The yarn treated with the more concentrated resin solution (b) contains approximately 25% resin and exhibits excellent receptivity for the same dyes. This yarn, however, has a tenacity of 1.0 g. p. d. at 9% elongation and is of decreased flexibility.

*Example IV*

A melamine-formaldehyde resin is prepared by adjusting a mixture of 65 parts of melamine and 91 parts of a 37% formaldehyde solution to pH-8 (ten drops of a 10% sodium hydroxide solution required) and then heating the solution with stirring until practically all of the melamine has gone into solution. This occurs at a temperature of about 85° C. The reaction mixture is then cooled. On cooling, the solution becomes viscous and then solidifies. This resin contains formaldehyde and melamine in a molar ratio of 1.75:1. This solid is insoluble in water but dissolves in dilute hydrochloric acid solution (about 1 part of concentrated 37% hydrochloric acid solution per 100 parts of water). The resin-treating solution consists of 10 parts of the above concentrated resin solution and 90 parts of the dilute hydrochloric acid solution. Insoluble resin commences to precipitate from this solution within a few hours and, accordingly, the solution must be used soon after it is prepared.

Gel polyacrylonitrile yarn (similar to that of Examples I-III) is exposed for 30 minutes to a 10% aqueous glycerol solution. The yarn is then skeined and immersed in the above-described resin-treating solution for 30 minutes at 25° C. After rinsing in acetone, the yarn is wrapped on a bobbin, air dried at room temperature and then heated in an air oven at 140° C. for 30 minutes. The yarn is boiled-off in skein form and then dried. A shrinkage of 6.6% occurs during this treatment. The resulting yarn contains approximately 18% resin and has a denier of 445 and a tenacity of 1.4 g. p. d. at 12.5% elongation. The yarn shows good receptivity for representative acid, direct, and vat dyes but is somewhat inferior in this respect to the resin-modified yarns of Examples II and III. The control yarns for this treatment are the same as those of Example II.

A polyacrylonitrile gel yarn treated in the same manner as described above except that the treating solution consists of 30 parts of the concentrated resin and 70 parts of the dilute hydrochloric acid solution contains 47% of resin and exhibits good receptivity for the same dyes. This yarn, however, is quite brittle and has a tenacity of only 0.9 g. p. d. at only 4% elongation.

Samples of polyacrylonitrile gel yarn were treated with aqueous solutions containing different amounts of a commercial melamine-formaldehyde resin ("Resloom" NC-50). The formaldehyde-melamine molar ratio of this resin is in the range 3.0-3.5:1. The yarns obtained from these treatments, varying in resin content from 17% to 55% resin, show essentially no receptivity for the same dyes.

*Example V*

A concentrated phenol-formaldehyde resin solution is prepared by mixing 130 parts of 88% phenol, 98 parts of a 37% aqueous formaldehyde solution, 1.1 parts of ammonium chloride, and 1.25 parts of oxalic acid and heating this mixture with stirring to 60-62° C. The reaction mixture is kept at this temperature until a cloudiness results on adding one part of the reaction mixture to four parts of water. At this stage of the reaction the resin solution is cooled to 25° C. The formaldehyde and phenol used in preparing this resin are in a molar ratio of 1:1. The resin-treating solution consists of 30 parts of this concentrated resin solution, 60 parts of water, 10 parts of 2-B alcohol, and 0.2 part of p-toluenesulfonic acid. This solution should be used within a day or so of its preparation since a water-insoluble resin phase commences to separate from the solution after a few days. The alcohol improves the life of this solution.

Gel polyacrylonitrile yarn (similar to that of Examples I-IV) is immersed for thirty minutes in a 10% aqueous glycerol solution. A skein of this yarn is then prepared and immersed for 30 minutes in the resin-treating solution described above. After blotting well with absorbent paper, the yarn is wrapped on a bobbin, air dried and then heated for 30 minutes in an air oven at 140° C. The baked yarn is then boiled-off in skein form and dried. A total shrinkage of 6.8% occurs during this treatment and the resulting yarn shows good receptivity for representative acid, direct, and vat dyes. This yarn contains approximately 14% resin and has a denier of 400 and a tenacity of 1.4 g. p. d. at 13% elongation. The control yarn is the same as that described in Example III.

*Example VI*

A concentrated hexamethylenediamine-modified urea/formaldehyde (1:2) resin solution is prepared in the manner described previously in Example I using 44.5 parts of urea instead of the 60 parts used therein. Gel polyacrylonitrile yarn (similar to that of Examples I-V) is immersed in skein form for two hours at 25° C. in a resin-treating solution consisting of 20 parts of this concentrated resin solution, 80 parts of water, and 0.3 part of p-toluenesulfonic acid. The yarn is then removed, centrifuged to remove surface liquid, wrapped on a bobbin, air dried, and baked in an air over at 135–140° C. for 30 minutes, and finally boiled-off in skein form for 30 minutes. The resulting treated yarn exhibits fairly good receptivity for representative acid, direct, and vat dyes. However, it is noticeably inferior in receptivity to resin-treated yarn similarly prepared using the hexamethylenediamine-modified 1:1.65 urea formaldehyde resin of Examples I–III.

Gel polyacrylonitrile yarn similarly treated with a hexamethylenediamine-modified 1:2.5 urea/formaldehyde resin exhibits practically no receptivity for representative acid dyes.

The heat reactive, i. e., thermosetting, formaldehyde resins, which together with the acrylonitrile polymers constitute the new compositions of this invention, are those of formaldehyde with active hydrogen containing organic compounds. The best known and most readily available of these are those wherein the active hydrogens are phenolic, amino, and amido hydrogens, i. e., phenoplast and aminoplast resins. Any such resin can be used in preparing the compositions of this invention. However, because of their greater availibility and low cost it is preferred to use the phenol/formaldehyde and amide/formaldehyde, particularly the urea/formaldehyde resins.

As already illustrated by the examples, the molar ratio of formaldehyde to the active hydrogen containing compound in the thermosetting formaldehyde resins is of importance. More specifically, to obtain the new and outstanding compositions of this invention the formaldehyde resins should contain formaldehyde and the active hydrogen containing compound in molar ratios ranging from 1.0:1 to 2.0:1. Even better results are obtained with the aminoplast resins containing the formaldehyde and —NH₂ compound in molar ratios of 1.5:1 to 1.7:1 and such resins are accordingly preferred. In the case of phenoplasts a ratio of formaldehyde to the phenol of 1.0:1 to 1.4:1 is preferred. There is little to choose between the phenol/formaldehyde and amide/formaldehyde resins either as to costs or to outstanding properties of the acrylonitrile polymer compositions of this invention. However, the phenol/formaldehyde resins generally impart some color to the compositions and accordingly are not desirable in certain outlets wherein freedom from color is necessary, e. g., in certain yarn uses. Better overall results have been obtained with the urea/formaldehyde resins, particularly those modified with diamines, preferably alkylene diprimary diamines, e. g., hexamethylenediamine wherein the diamine is present in an amount of 0.03 to 0.12 mole per mole of urea (see the copending application of McClellan Ser. No. 154,727, filed April 7, 1950) and such resins are accordingly preferred.

As has also been illustrated by the examples, the amount of formaldehyde resin in the acrylonitrile polymer compositions of this invention is quite critical. Unless the compositions contain more than 5% formaldehyde resin they exhibit essentially the same dyeabilities as the corresponding unmodified acrylonitrile polymer. Compositions containing more than 30% of the formaldehyde resin, although exhibiting greatly improved dyeability, possess considerably inferior physical properties over the corresponding unmodified acrylonitrile polymer. Furthermore, compositions containing less than about 10% of the formaldehyde resin do not exhibit a preferred improvement in dyeability over the unmodified acrylonitrile polymer and compositions containing more than about 20% of the formaldehyde resin, although having excellent dye receptivity, are undesirably lacking in the desirable physical properties as contrasted to the unmodified acrylonitrile polymers. Accordingly, the preferred compositions of this invention contain from 10 to 20%, and preferably 15 to 20%, of the formaldehyde resin by weight of the total composition.

As previously stated, the shaped objects of the acrylonitrile polymer in the gel stage, preferably an aqueous (including aqueous alchoholic) gel stage, are treated with the formaldehyde resin in aqueous solution. This treating step can be carried out at temperatures ranging from about 0° to about 80–90° C. At temperatures appreciably above this range the gel acrylonitrile polymer tends to irreversibly degel, i. e., dehydrate. It is impractical to carry out the treating step at appreciably lower temperatures since aqueous treating solutions are used. Accordingly, the process is not carried out at temperatures outside this range. For obvious reasons of cost and convenience, it is preferred to carry out this treating step at room temperature, e. g., in the range 20–30° C.

After the shaped acrylonitrile object has absorbed the desired amount of the formaldehyde resin the gel is irreversibly broken, i. e., the water is removed. This is usually and most conveniently done by allowing the treated gel object to stand at room temperature for periods ranging from one-half hour to 24 hours or longer. Usually one-half hour is sufficient. This dehydration can be carried out at elevated temperatures, e. g., 60–70° C. At higher temperatures the water is removed so fast that the shaped objects tend to expand.

The absorbed formaldehyde resin must be thermoset, i. e., cross-linked, so that it will not be extractable from the final shaped object. This is most conveniently and conventionally done by the application of heat—usually in the range 120–160° C. for ten minutes to an hour or longer. From the foregoing it will be seen that the irreversible breaking of the acrylonitrile polymer gel and the setting of the formaldehyde resin could be carried out simultaneously by the application of heat. However, as mentioned above it is preferred to air dry the compositions first to break the gel, or at least not to heat the swollen gel above 60–70° C., so as not to expand the shaped structure.

The acrylonitrile polymers which, together with the formaldehyde resins, form the new compositions of this invention, are acrylonitrile homopolymer or copolymers, particularly those containing a major proportion, e. g., 85% or more, of combined acrylonitrile. Since it is with this class of acrylonitrile polymers, i. e., those of at least 85% acrylonitrile content, that dyeing becomes a vexing problem this class is preferred. Among the acrylonitrile copolymers which can be used there may be mentioned those with other monoethylenically unsaturated addition polymerizables containing a terminal methylene group doubly bonded to the adjacent carbon, e.g., methacrylonitrile, vinyl acetate, methyl methacrylate, and the amino nitrogen containing copolymerizables of this type, e. g., the vinyl pyridines. Any soluble acrylonitrile polymer or copolymer of the above types can be employed. The molecular weight of the polymer is generally not critical, but polymers having a medium molecular weight, e. g., from 50,000 to 100,000, offer the best balance of solubility and physical properties in the resulting shaped objects. The compositions of this invention are of greatest utility in the formation of films and fibers, particularly the latter.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process wherein an aqueous irreversible gel polyacrylonitrile fiber containing 20 to 50% acrylonitrile polymer, said polymer being of at least 85% acrylonitrile content, is impregnated with an aqueous solution of a thermosetting urea/formaldehyde/hexamethylene diamine resin containing 1.5 to 1.7 moles formaldehyde and 0.03 to 0.12 mole hexamethylene diamine, per mole of urea until from 10 to 20%, by weight of the total of acrylonitrile polymer and the resin, of said resin is incorporated in the gel fiber, the resin impregnated acrylonitrile polymer fiber is dried, and the resin is heat set in the fiber by baking.

2. Process wherein an aqueous irreversible gel polyacrylonitrile fiber containing 20 to 75% acrylonitrile polymer, said polymer being of at least 85% acrylonitrile content, is impregnated with an aqueous solution of a thermosetting urea/formaldehyde/alkylene diprimary diamine resin containing 1.5 to 1.7 moles formaldehyde and 0.03 to 0.12 mole alkylene diprimary diamine per mole of urea until from 10 to 20%, by weight of the total of acrylonitrile polymer and the resin, of said resin is incorporated in the gel fiber, the resin impregnated acrylonitrile polymer fiber is dried, and the resin is heat set in the fiber by baking.

3. Process wherein an aqueous irreversible gel polyacrylonitrile fiber containing 20 to 75% acrylonitrile polymer, said polymer being of at least 85% acrylonitrile content, is impregnated with an aqueous solution of a thermosetting urea/formaldehyde resin containing 1.5 to 1.7 moles formaldehyde per mole of urea until from 10 to 20%, by weight of the total of acrylonitrile polymer and the resin, of said resin is incorporated in the gel fiber, the resin impregnated acrylonitrile polymer fiber is dried, and the resin is heat set in the fiber by baking.

4. Process wherein an aqueous irreversible gel polyacrylonitrile fiber containing 20 to 75% acrylonitrile polymer, said polymer being of at least 85% acrylonitrile content, is impregnated with an aqueous solution of a thermosetting aminoplast resin containing 1.5 to 1.7 moles formaldehyde per mole of —$NH_2$ compound until from 10 to 20%, by weight of the total of acrylonitrile polymer and the resin, of said resin is incorporated in the gel fiber, the resin impregnated acrylonitrile polymer fiber is dried, and the resin is heat set in the fiber by baking.

5. Process wherein an aqueous irreversible gel polyacrylonitrile fiber containing 20 to 75% acrylonitrile polymer, said polymer being of at least 85% acrylonitrile content, is impregnated with an aqueous solution of a thermosetting phenol/formaldehyde resin containing 1.0 to 1.4 moles formaldehyde per mole of phenol, $C_6H_5OH$, until from 10 to 20%, by weight of the total of acrylonitrile polymer and the resin, of said resin is incorporated in the gel fiber, the resin impregnated acrylonitrile polymer fiber is dried, and the resin is heat set in the fiber by baking.

6. Process wherein an aqueous irreversible gel polyacrylonitrile fiber containing 20 to 75% acrylonitrile polymer, said polymer being of at least 85% acrylonitrile content, is impregnated with an aqueous solution of a thermosetting phenoplast resin containing 1.0 to 1.4 moles formaldehyde per mole of the phenol until from 10 to 20%, by weight of the total of acrylonitrile polymer and the resin, of said resin is incorporated in the gel fiber, the resin impregnated acrylonitrile polymer fiber is dried, and the resin is heat set in the fiber by baking.

7. Process wherein an aqueous irreversible gel polyacrylonitrile fiber containing 20 to 75% acrylonitrile polymer, said polymer being of at least 85% acrylonitrile content, is impregnated with an aqueous solution of a thermosetting resin of the class consisting of phenoplast resins containing 1.0 to 2.0 moles formaldehyde per mole of pehnol and aminoplast resins containing 1.0 to 2.0 moles formaldehyde per mol of —$NH_2$ compound until from 5 to 30%, by weight of the total of acrylonitrile polymer and the resin, of said resin is incorporated in the gel fiber, the resin impregnated acrylonitrile polymer fiber is dried, and the resin is heat set in the fiber by baking.

8. Process wherein an aqueous irreversible gel polyacrylonitrile shaped object having one dimension large with respect to at least one other dimension and containing 20 to 75% acrylonitrile polymer, said polymer being of at least 85% acrylonitrile content, is impregnated with an aqueous solution of a thermosetting resinous condensation product of the class consisting of phenoplast resins containing 1.0 to 2.0 moles formaldehyde per mole of phenol and aminoplast resins containing 1.0 to 2.0 moles formaldehyde mole of —$NH_2$ compound until from 5 to 30%, by weight of the total of acrylonitrile polymer and the resin, of said resin is incorporated in the gel shaped object, the resin impregnated acrylonitrile polymer shaped object is dried, and the resin is heat set in the shaped object by baking.

9. A fiber of an acrylonitrile polymer of at least 85% acrylonitrile content, said fiber containing, within the polymer structure, from 5 to 30%, by weight of said fiber, of a thermoset resinous condensation product of the class consisting of phenoplast resins containing 1.0 to 2.0 moles formaldehyde per mole of phenol and aminoplast resins containing 1.0 to 2.0 moles formaldehyde per mole of —NH$_2$ compound.

10. A shaped object of an acrylonitrile polymer of at least 85% acrylonitrile content, said shaped object containing, within the polymer structure, from 5 to 30%, by weight of said shaped object, of a thermoset resinous condensation product of the class consisting of phenoplast resins containing from 1.0 to 2.0 moles formaldehyde per mole of phenol and aminoplast resins containing from 1.0 to 2.0 moles formaldehyde per mole of —NH$_2$ compound.

11. A shaped object of an acrylonitrile polymer of at least 85% acrylonitrile content, said shaped object containing, within the polymer structure, from 10 to 20%, by weight of said shaped object, of a thermoset resinous condensation product of 1.0 to 1.4 moles of formaldehyde with one mole of a phenol.

12. A shaped object of an acrylonitrile polymer of at least 85% acrylonitrile content, said shaped object containing, within the polymer structure, from 10 to 20%, by weight of said shaped object, of a thermoset resinous condensation product of 1.0 to 1.4 moles of formaldehyde with one mole of phenol.

13. A shaped object of an acrylonitrile polymer of at least 85% acrylonitrile content, said shaped object containing, within the polymer structure, from 10 to 20%, by weight of said shaped object, of a thermoset aminoplast resin containing from 1.5 to 1.7 moles formaldehyde per mole of —NH$_2$ compound.

14. A shaped object of an acyrlonitrile polymer of at least 85% acrylonitrile content, said shaped object containing, within the polymer structure, from 10 to 20%, by weight of said shaped object, of a thermoset resinous condensation product of 1.5 to 1.7 moles of formaldehyde with one mole of urea.

15. A shaped object of an acrylonitrile polymer of at least 85% acrylonitrile content, said shaped object containing, within the polymer structure from 10 to 20%, by weight of said shaped object, of a thermoset resinous condensation product of 1.5 to 1.7 moles of formaldehyde and 0.03 to 0.12 moles of an alkylene diprimary diamine with one mole of urea.

16. A shaped object of an acrylonitrile polymer of at least 85% acrylonitrile content, said shaped object containing, within the polymer structure, from 10 to 20%, by weight of said shaped object, of a thermoset resinous condensation product of 1.5 to 1.7 moles of formaldehyde and 0.03 to 0.12 moles of hexamethylene diamine with one mole of urea.

References Cited in the file of this patent

UNITED STATES PATENTS

| Number | Name | Date |
|---|---|---|
| 2,191,581 | Nowak et al. | Feb. 27, 1940 |
| 2,462,428 | Roesti | Feb. 22, 1949 |
| 2,463,032 | Hanson | Mar. 1, 1949 |
| 2,491,454 | Nute | Dec. 13, 1949 |
| 2,534,717 | Kropa et al. | Dec. 19, 1950 |
| 2,556,885 | Ness | June 12, 1951 |